(12) United States Patent
Giurgiu et al.

(10) Patent No.: US 9,684,081 B2
(45) Date of Patent: Jun. 20, 2017

(54) METHOD AND APPARATUS FOR PROVIDING A LOCATION DATA ERROR MAP

(71) Applicant: HERE Global B.V., Veldhoven (NL)

(72) Inventors: Gavril Giurgiu, Chicago, IL (US);
Dongwook Jang, Lisle, IL (US);
Joshua Thompson, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/856,143

(22) Filed: Sep. 16, 2015

(65) Prior Publication Data

US 2017/0074659 A1    Mar. 16, 2017

(51) Int. Cl.

| | |
|---|---|
| *G01C 21/20* | (2006.01) |
| *G01C 21/28* | (2006.01) |
| *G01C 21/30* | (2006.01) |
| *G01C 21/32* | (2006.01) |
| *G01C 21/00* | (2006.01) |
| *G01S 19/07* | (2010.01) |
| *G01S 19/40* | (2010.01) |
| *G01S 19/41* | (2010.01) |
| *G01S 19/42* | (2010.01) |
| *G01S 19/49* | (2010.01) |

(52) U.S. Cl.
CPC ............ *G01S 19/41* (2013.01); *G01C 21/005* (2013.01); *G01C 21/20* (2013.01); *G01C 21/28* (2013.01); *G01C 21/30* (2013.01); *G01C 21/32* (2013.01); *G01S 19/07* (2013.01); *G01S 19/40* (2013.01); *G01S 19/42* (2013.01); *G01S 19/49* (2013.01)

(58) Field of Classification Search
CPC ...... G01C 21/005; G01C 21/28; G01C 21/30; G01C 21/32; G01S 19/07; G01S 19/40; G01S 19/41; G01S 19/42; G01S 19/49
See application file for complete search history.

(56) References Cited

U.S. PATENT DOCUMENTS

| | | | | |
|---|---|---|---|---|
| 5,563,608 | A * | 10/1996 | Tachita | G01C 21/30 701/472 |
| 5,742,923 | A * | 4/1998 | Odagawa | G01C 21/30 701/446 |
| 8,498,813 | B2 * | 7/2013 | Oohashi | G01C 21/30 701/472 |
| 2005/0283699 | A1 * | 12/2005 | Nomura | G01C 21/32 714/746 |
| 2009/0234580 | A1 * | 9/2009 | Fernandez-Hernandez | G01C 21/30 701/436 |
| 2010/0079333 | A1 * | 4/2010 | Janky | G01S 19/43 342/357.24 |
| 2012/0246192 | A1 * | 9/2012 | Kenyon | G01C 21/32 707/769 |

(Continued)

*Primary Examiner* — Dale W Hilgendorf
(74) *Attorney, Agent, or Firm* — Ditthavong & Steiner, P.C.

(57) ABSTRACT

An approach is provided for generating location data error maps. The approach involves determining location data error information associated with at least one set of location data. The approach also involves causing, at least in part, an encoding of the location data error information as a function of a position parameter. The approach further involves causing, at least in part, a generation of at least one location data error map based, at least in part, on the encoding.

20 Claims, 12 Drawing Sheets

(56) References Cited

U.S. PATENT DOCUMENTS

| | | | | |
|---|---|---|---|---|
| 2013/0278466 A1* | 10/2013 | Owen | ............... | G01S 19/22 |
| | | | | 342/464 |
| 2013/0337834 A1* | 12/2013 | Alpert | ............... | G01S 19/40 |
| | | | | 455/456.1 |
| 2015/0149073 A1* | 5/2015 | Ishigami | ............ | G01C 21/30 |
| | | | | 701/409 |

* cited by examiner

METHOD AND APPARATUS FOR PROVIDING A LOCATION DATA ERROR MAP

BACKGROUND

There is a growing interest in the development of vehicles that are highly automated and increasingly interactive with the vehicle users (e.g., autonomous vehicles, highly-assisted vehicles (HAD), advanced driver assistance systems (ADAS), etc.). With the development of such vehicles, there also is a growing recognition of the need for high precision mapping or location data to ensure optimal autonomous operation and related vehicle navigation functions. Accordingly, service and content providers (e.g., mapping data providers) face significant technical challenges to determining and presenting precision or error information about location data for points on the globe (e.g., expected Global Positioning Satellite (GPS) error or other location sensing error at a given location).

Some Example Embodiments

Therefore, there is a need for an approach providing location data error maps which associates location data error with location points in a geographic area.

According to one embodiment, a method comprises determining location data error information associated with at least one set of location data. The method also comprises causing, at least in part, an encoding of the location data error information as a function of a position parameter. The method further comprises causing, at least in part, a generation of at least one location data error map based, at least in part, on the encoding.

According to another embodiment, an apparatus comprises at least one processor, and at least one memory including computer program code, the at least one memory and the computer program code configured to determine location data error information associated with at least one set of location data. The apparatus also causes, at least in part, an encoding of the location data error information as a function of a position parameter. The apparatus further causes, at least in part, a generation of at least one location data error map based, at least in part, on the encoding.

According to another embodiment, a computer-readable storage medium carries one or more sequences of one or more instructions which, when executed by one or more processors, determine a plurality of notifications associated with one or more curved sections of at least one travel segment. The apparatus is also caused to cause, at least in part, an aggregation of the plurality of notifications into at least one aggregated notification based, at least in part, on a road distance threshold between the one or more curved sections. The apparatus is further caused to cause, at least in part, a presentation of the at least one aggregated notification in place of separately presenting the plurality of notifications.

According to another embodiment, an apparatus comprises means for determining location data error information associated with at least one set of location data. The apparatus also comprises means for causing, at least in part, an encoding of the location data error information as a function of a position parameter. The apparatus further comprises means for causing, at least in part, a generation of at least one location data error map based, at least in part, on the encoding.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing location data error maps are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
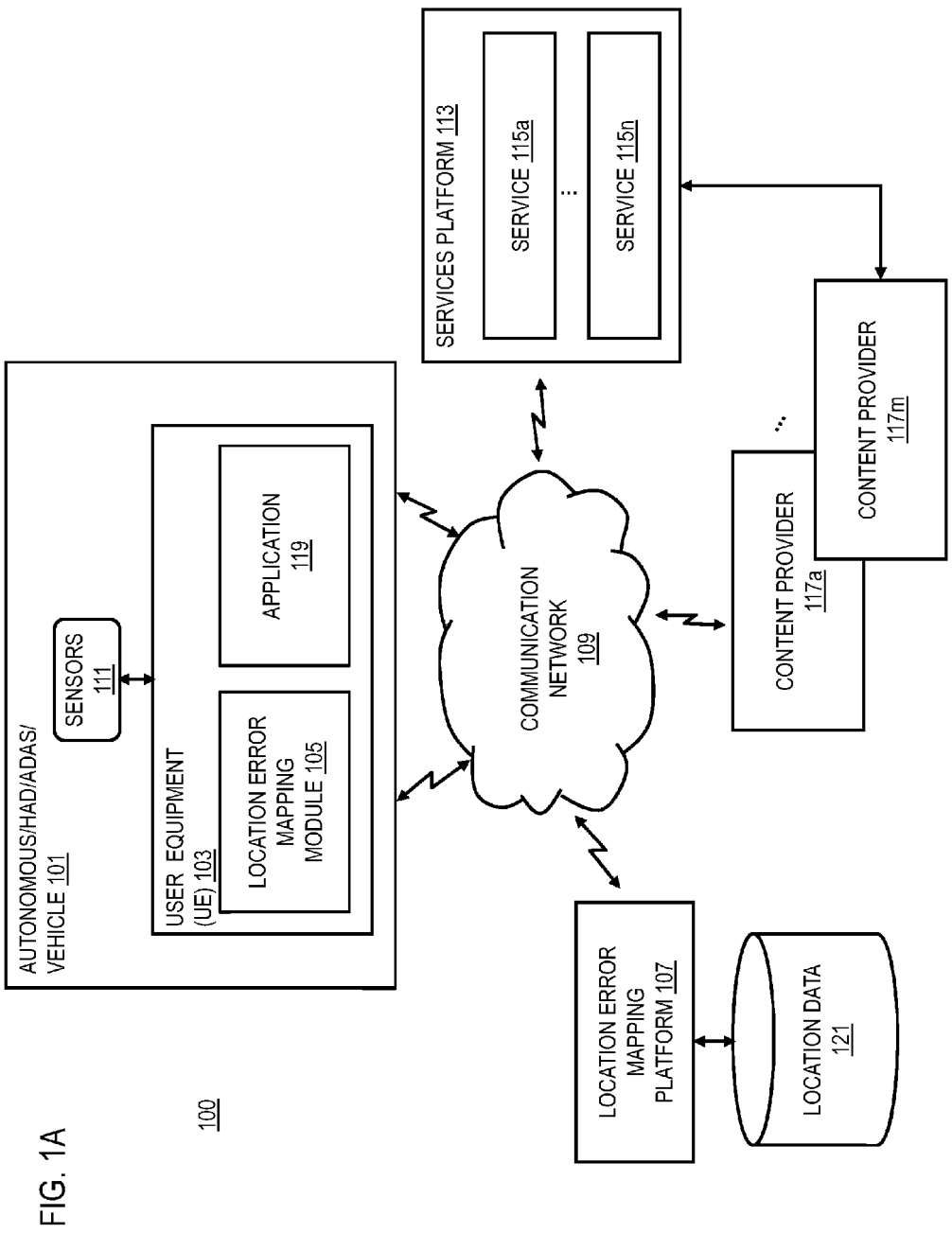
FIG. 1A is a diagram of a system capable of providing a location data error map, according to one embodiment.

FIG. 1A is a diagram of a system 100 capable of providing aggregated notifications for travel segments, according to one embodiment. As noted above, in order to navigate safely, vehicles that operate autonomously or semi-autonomously (e.g., autonomous vehicles, high-assisted (HAD) vehicles, advanced driver assistance system (ADAS) vehicles, etc.) generally have to position themselves on a road map with high precision. For example, the level of precision traditionally needed is on the order of 10 centimeters or less. However, maintaining such positioning precision consistently is generally beyond the capabilities of current typical navigation devices.

For example, traditional navigation devices generally rely on satellite-based location positioning (e.g., Global Positioning System (GPS), Global Navigation Satellite System (GLONASS), etc.) in combination with dead-reckoning (e.g., inertial or local sensor-based positioning systems such as Inertial Measurement Units (IMU)) to determine position information (e.g., a vehicle position). The position data estimated by these systems is usually a combination of GPS location fused with the location predicted by the IMU using, for instance, dead reckoning. In some systems, the position data is further refined by "map matching" the determined position onto a road network. The typical errors of navigation devices are of the order of 5-10 meters, but can potentially be much larger. For example, in areas where "urban canyon" effects affect satellite-based positioning accuracy, potential errors can reach 20 meters or more. Accordingly, the variability of location data precision or error at different locations can be problematic for vehicles that depend on precise location or positioning data to operate.

To address this problem, a system 100 of FIG. 1A introduces a capability to generate a location data error map (e.g., a digital map) that associates location data error or uncertainty with points on the globe. In other words, various embodiments of the location data error map described herein present location data error information as a function of a position parameter. In one embodiment, the position parameter can reflect a point on the globe, or in particular, a position along a road network. In one embodiment, such location data error map would also be a function of one or more contextual parameters (e.g., time of the day—since satellite positioning is time dependent, atmospheric conditions, weather conditions, etc.).

In one example use case and embodiment, such location data error maps can be used by vehicles (e.g., autonomous, HAD, ADAS, etc. vehicles) and/or navigation systems to determine optimal routes for which expected location data errors are minimized, thereby potentially enabling autonomous or semi-autonomous operation of the vehicle. For example, it may be difficult for a vehicle to drive autonomously in downtown cities where urban canyon effects would severely affect satellite-based positioning. In such urban canyon areas, it is not uncommon that navigation devices encounter sufficiently high location data error to place a current position of the device or associated vehicle on neighboring streets instead of the actual street on which the device or vehicle is traveling. In one embodiment, a vehicle or navigation device can potentially pre-empt such situations by consulting a location data error map generated according to the various embodiments described herein to avoid streets or routes with large expected location data error (e.g., GPS error).

In one embodiment, knowing location data error at specific locations in advance would also enable optimization of the selection of and/or fusion between various location measurements that contribute to the vehicle positioning. In addition, knowing in advance that a vehicle is approaching an area with high location data error (e.g., low GPS quality) can prompt the navigation system to focus available resources (e.g., computational resources, energy resources, bandwidth resources, memory resources, etc.) towards other potential positioning mechanisms or measurements that may currently provide better accuracy or less error.

For example, in one embodiment, a non-satellite-based positioning mechanism can include the use of road furniture such as traffic lights, road signs, markings, etc. to determine a current position (e.g., vehicle position) relative to the detected road furniture. In one embodiment, detection of such road furniture can be performed using pattern recognition algorithms to analyze multiple consecutive in-car-camera images to identify known road objects such as traffic lights. The relative position of the vehicle with respect to the identified road object or furniture is determine using triangulation from consecutive images in which the object is identified. If the absolute position of the road object is known and the relative position of the vehicle with respect to the road object is know from triangulation, the absolute vehicle is determined by combining the absolute road object location and the relative position of the vehicle with respect to the road object. In one embodiment, the final result would be an absolute vehicle position and associated error. By way of example, the associated error is a combination of between the road object location error and the triangulation error. In addition or alternatively, road markings (e.g., white lines on the road) can be used to further refine the position (e.g., lateral position) of the vehicle on the road.

In one embodiment, the system 100 can fuse together one or more various location positioning methods (e.g., GPS, IMU, map matching, road markings, triangulation with respect to road furniture, and/or any other available positioning method) to provide a best available vehicle positioning system. Such fusion can be very computationally expensive and it will be important to know the errors of each contributor (e.g., each location positioning method) to the final determined position. Accordingly, in one embodiment, the system 100 can generate a location data error map that stratifies error based on location sensing device. In this way, the resulting location data error map can be queried to determine which location positioning methods to use to provide a desired level of location data precision or best available location data precision.

In one embodiment, the combination of various location estimates resulting from the various location positioning methods can be performed using any data aggregation method including, for instance, a Kalman filter algorithm. In one embodiment, the Kalman filter position estimate is a type of weighted average of the different position estimates or measurements in which the weights are inversely proportional to the respective estimated errors of different contributing measurements. In other words, the position estimate with the smallest estimated error will dominate the average, while the position estimate with the largest estimated error will have the smallest influence on the final position estimate. For example, if the GPS error estimate is small and the triangulation error estimate is large, then the final position estimate will be close to the GPS position estimate. On the other hand, if the GPS error estimate is large and the triangulation error estimate is small, then the combined position estimate will be close to the triangulation position estimate.

As shown in FIG. 1A, the system 100 comprises an autonomous/HAD/ADAS vehicle 101 configured with at least one user equipment (UE) 103 including a location error mapping module 105 that performs functions related to providing a location data error map. In one embodiment, the autonomous vehicle 101, the UE 103, and/or the location error mapping module 105 have connectivity to a location error mapping platform 107 over a communication network 109. By way of example, the location error mapping platform 107 may be a network component that can perform all or a portion of the functions related to providing a location error map as discussed with respect to the various embodiments described herein. In one embodiment, the location error mapping platform 107 can operate in a client-server architecture with the location error mapping module 105 to provide a location data error map. In addition or alternatively, the location error mapping platform 107 can operate alone and/or independently as a network service. Similarly, the location error mapping module 105 can operate alone and/or independently to provide related to location data error mapping locally at the vehicle 101 and/or the UE 103.

By way of example, the UE 103 is any type of mobile terminal, fixed terminal, or portable terminal including an embedded system, infotainment system, mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles 101 or any combination thereof, including the accessories and peripherals of these devices, or any combination thereof. It is also contemplated that the UE 103 can support any type of interface to the user (such as "wearable" circuitry, etc.). In one embodiment, the one or more vehicles may have cellular or WIFI (a wireless networking technology that uses radio waves to provide wireless high-speed Internet and network connections) connection either through the inbuilt communication equipment or from the UE 103 associated with the vehicles.

Although the UE 103 is depicted as a separate component from the autonomous vehicle 101, it is contemplated that the functions of the UE 103 and/or the location error mapping module 105 may be performed or embedded in the autonomous vehicle 101 or a component of the autonomous vehicle 101. As shown, the autonomous vehicle 101 is further configured with the sensors 111 that support a variety of location positioning methods or means including, but not limited, to satellite-based position, triangulation-based positioning, dead-reckoning, etc. For example, the sensors 111 may include location sensors, motion sensors, visual sensors including infrared sensors, lasers, radar, sonar, cameras (e.g., visible, night vision, etc.), and/or other devices/sensors that can scan and record data for the autonomous vehicle 101's surroundings related to providing or using location data error maps.

In one embodiment, the sensors 111 also may be any type of sensor to detect information about the environment surrounding the autonomous vehicle 101. The sensor system 111 may include, for instance, sensors configured to monitor internal systems of the autonomous vehicle 101 (e.g., fuel gauge, engine oil temperature, wheel speed sensors, driver awareness sensors, etc.). In one embodiment, one or more of the sensors 111 may be configured to be actuated separately or collectively in order to modify a position and/or an orientation of the one or more sensors 111. In some embodiments, the sensor system 111 may include an IMU, a laser rangefinder/LIDAR unit, a radar unit, infrared, an image gathering device such as a camera, or a microphone. In certain embodiments, the sensors 111 may include, for example, a health sensor (e.g. heart-rate monitor, blood pressure monitor, etc.), a network detection sensor for detecting wireless signals or receivers for different short-range communications (e.g., BLUETOOTH (a wireless technology standard for exchanging data over short distances using short-wavelength UHF radio waves in the ISM band from 2.4 to 2.485 GHz), WIFI, LI-FI (the use of the visible light portion of the electromagnetic spectrum to transmit information at very high speeds), near field communication (NFC) etc.), temporal information sensors, a camera/imaging sensor for gathering image data, an audio recorder for gathering audio data, and the like.

In one embodiment, the sensors 111 may include, orientation sensors augmented with height sensor and acceleration sensor, tilt sensors to detect the degree of incline or decline of the vehicle along a path of travel, light sensors, moisture sensors, pressure sensors, audio sensors (e.g., microphone), etc. In another embodiment, the sensors 111 may detect weather data, passenger status (e.g., the number of passengers actively seated), etc. Further, sensors about the perimeter of the vehicle may detect the relative distance of the vehicle from sidewalks, lane or roadways, the presence of other vehicles, trees, benches, water, potholes and any other objects, or a combination thereof. Still further, the one or more sensors may provide in-vehicle navigation services, wherein one or more location based services may be provided to the at least one UE 103 associated with the at least one user of the vehicle and/or at least one other UE 103 associated with the autonomous vehicle 101.

In one embodiment, the sensor information can be supplemented with additional information from network-based services such as those provided by the services platform 113 and the services 115a-115n (also collectively referred to as services 115). By way of example, the services 115 can include location services, mapping services, navigation services, and/or other data services that provide data for determining location data error maps. In one embodiment, the services platform 113 and/or the services 115 can provide contextual information such weather, traffic, etc. as well as facilitate communications (e.g., via social networking services, messaging services, crowdsourcing services, etc.) among vehicles to share location data error information.

In one embodiment, the services platform 113 and/or the services 115 interact with content providers 117a-117m that provide content data (e.g., map data, crowd source data, imaging data, etc.) to the services platform 113 and/or the services 115. In one embodiment, the UE 103 executes an application 119 that acts as client to the services platform 113, the services 115, the location error mapping module 105, and/or the location error mapping platform 107. In one embodiment, the location data error, geographic information, and/or any other data associated with providing location data error maps can be stored in the geographic database 121 for use by the location error mapping platform 107 and/or any other component of the system 100.

By way of example, the communication network 109 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WIMAX), Long Term Evolution (LTE) networks, code division multiple access (CDMA), wideband code division multiple access (WCDMA), WIFI, wireless LAN (WLAN), Bluetooth®, Internet Protocol (IP) data casting, satellite, mobile ad-hoc network (MANET), and the like, or any combination thereof.

By way of example, the autonomous vehicle 101, the UE 103, the location error mapping module 105, the location error mapping platform 107, the sensors 111, and the application 119 communicate with each other and with other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

In one embodiment, the location error mapping platform 107 may be a platform with multiple interconnected components. The location error mapping platform 107 may include multiple servers, intelligent networking devices, computing devices, components and corresponding software for providing location data error maps.

Figure 1B:
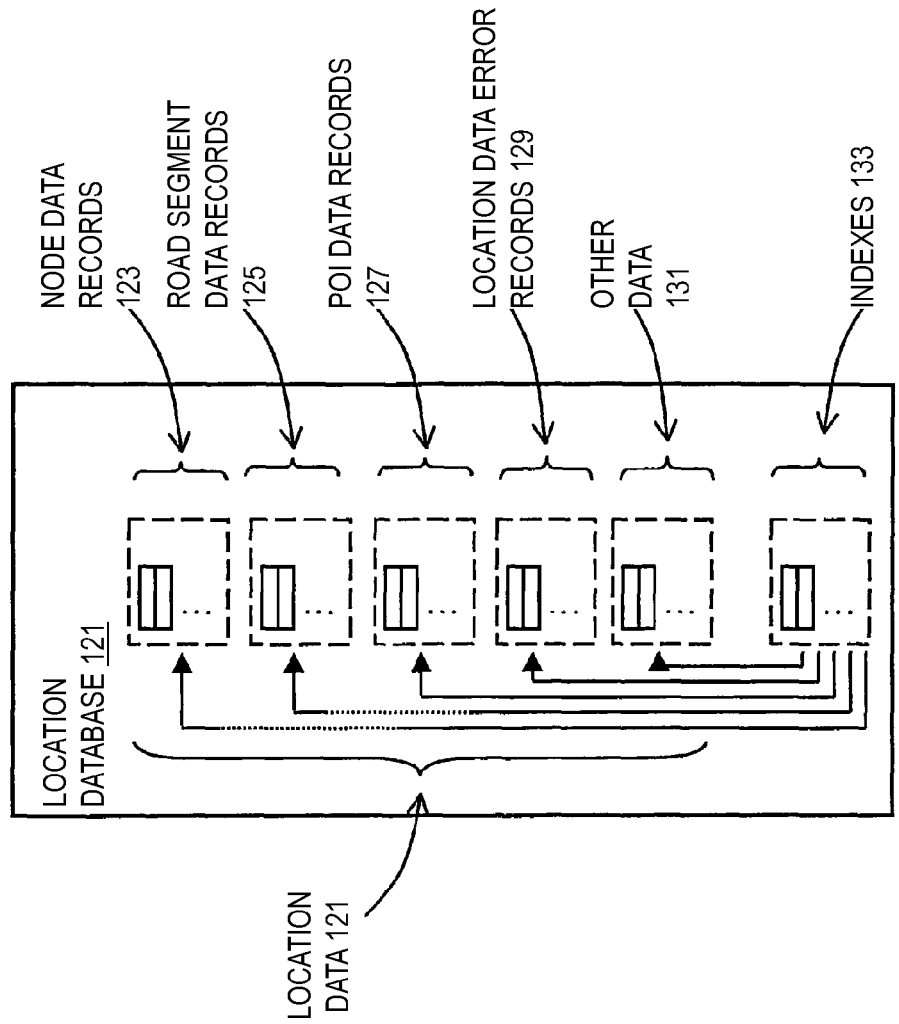
FIG. 1B is a diagram of a geographic database used for providing a location data error map, according to one embodiment.

FIG. 1B is a diagram of a geographic database used for providing a location data error map, according to one embodiment. In the exemplary embodiments, POIs and map generated POIs data can be stored, associated with, and/or linked to the geographic database 121 or data thereof. In one embodiment, the location or map database 121 includes location data used for (or configured to be compiled to be used for) mapping and/or navigation-related services, such as for autonomous vehicle operation, personalized route determination, etc., according to exemplary embodiments. For example, the geographic database 121 includes node data records 123, road segment or link data records 125, POI data records 127, location data error records 129, and other data records 131, and indexes 133, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or location records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 121 can contain path segment and node data records or other data that represent pedestrian paths or areas in addition to or instead of the vehicle road record data, for example.

The road link and nodes can be associated with attributes, such as location coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 121 can include data about the POIs and their respective locations in the POI data records 127. The geographic database 121 can also include data about places, such as cities, towns, or other communities, and other location features, such as bodies of water, mountain ranges, etc. Such place or feature data can be part of the POI data 127 or can be associated with POIs or POI data records 127 (such as a data point used for displaying or representing a position of a city).

In one embodiment, the geographic database 121 includes location data error records 129 for storing location error information various geographic locations. For example, the location data error records can store location data error information determined for different points on the globe. In one embodiment, the points are locations associated with one or more links or nodes of a road network stored in the geographic database. In one embodiment, the location data records 129 can include data fields for specifying location sensing devices and/or means for collecting the location data associated with the specified location data error estimates. In yet another embodiment, the location data records 129 can specify additional fields for specifying location data error information as a function of one or more contextual parameters (e.g., time of day, atmospheric condition, environment condition, etc.).

The geographic database 121 can be maintained by the content provider in association with the services platform 113 (e.g., a map developer). The map developer can collect location data to generate and enhance the geographic database 121. There can be different ways used by the map developer to collect data. These ways can include obtaining data from other sources, such as municipalities or respective location authorities (e.g., designated parking areas). In addition, the map developer can employ field personnel to travel by vehicle along roads throughout the location region to observe features and/or record information about them, for example. Also, remote sensing, such as aerial or satellite photography, can be used.

The geographic database 121 can be a master location database stored in a format that facilitates updating, maintenance, and development. For example, the master geographic database 121 or data in the master geographic database 121 can be in an spatial format developed by ORACLE or other spatial format, such as for development or production purposes. The spatial format or development/production database can be compiled into a delivery format, such as a location data files (GDF) format. The data in the production and/or delivery formats can be compiled or further compiled to form location database products or databases, which can be used in end user navigation devices or systems.

For example, location data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 103, for example. The navigation-related functions can correspond to autonomous vehicle operation, vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received location database in a delivery format to produce one or more compiled navigation databases.

As mentioned above, the geographic database 121 can be a master location database, but in alternate embodiments, the geographic database 121 can represent a compiled navigation database that can be used in or with end user devices (e.g., UEs 103) to provided navigation-related functions. For example, the geographic database 121 can be used with the UE 103 to provide an end user with navigation features. In such a case, the geographic database 121 can be downloaded or stored on the UE 103, such as in the applications 119, or the UE 103 can access the geographic database 121 through a wireless or wired connection (such as via a server and/or the communication network 109), for example.

Figure 2:
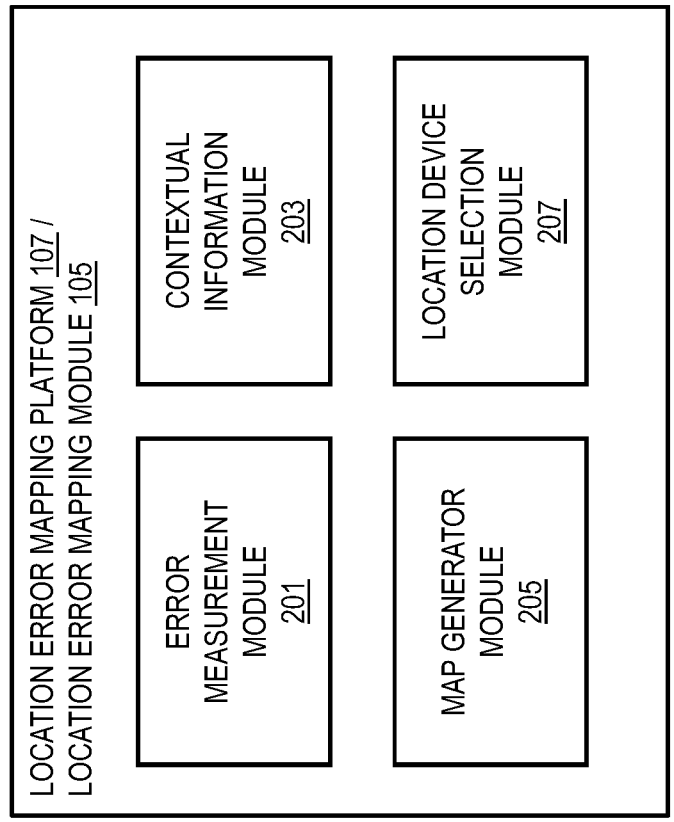
FIG. 2 is a diagram of the components of a location error mapping platform, according to one embodiment.

FIG. 2 is a diagram of the components of a location error mapping platform, according to one embodiment. By way of example, the location error mapping platform 107/location error mapping module 105 includes one or more components providing a location error map. In one embodiment, the location error mapping platform 107 is a network-based component for providing location data error maps, and the location error mapping module 105 is local or client side (e.g., on the UE 103) component for providing location data error maps. It is contemplated that the functions of these components may be combined in one or more components or performed by other components of equivalent functionality. In addition, description of functions ascribed to the location error mapping platform 107 are also applicable to the location data error mapping module 105 and vice versa. In one embodiment, the location error mapping platform 107/location error mapping module 105 includes an error measurement module 201, a contextual information module 203, a map generator module 205, and a location device selection module 207.

In one embodiment, the error measurement module 201 calculates or determines location data using any number of means including, for instance, map matching probe data, ground truth drives, aerial imagery analysis, analysis of map features that can potentially interfere with positioning mechanisms, or a combination thereof. In one embodiment, with respect to map matching, the error measurement module 201 can perform map matching of probe data (e.g., data collected from GPS probes indicating at least heading and speed information of probes traveling in a road network). More specifically, the error measurement module 201 can use a path-based map matching which uses long location data traces (e.g., GPS traces) to infer a true vehicle trajectory. Generally, it is observed that use of location traces, particularly long traces, can provide for more accurate inferences of a vehicle trajectory when compared to using point-based map matching. However, it is contemplated that the error measurement module 201 can use any map-matching means to infer a true vehicle trajectory.

In one embodiment, once a true vehicle trajectory is inferred from map matching of probe traces, the error measurement module 201 can determine deviations of the probe data from the determined true vehicle trajectory at various locations along the trajectory. For example, the error measurement module 201 can segment the vehicle trajectory (and underlying road network against which the trajectory is matched) at fixed intervals (e.g., every 10 meters), a selected key points, and/or other predetermined points, and then measure deviations at these intervals, key points, and/or predetermined points. In one embodiment, the deviation of the probe data from the true vehicle trajectory provides an estimate of the location data uncertainties at the respective locations.

In one embodiment, the error measurement module 201 can process location data collected from "ground truth drives" along designated routes. In this embodiment, a ground truth drive is performed over a route that is known in advance, so that the vehicle trajectory is known and need not be inferred from collected location traces as in the process above. To measure location data error, the error measurement module 201 then compares the recorded location data (e.g., a GPS position) at a given time with the true position (e.g., known in advance) at the same time. By way of example, the true position can be obtained by map matching the vehicle location traces when the true route is known in advance. As with the process above, the error measurement module 201 can perform the comparisons at various locations along the route to measure location data error or uncertainties over a given physical distance or area of a map.

In one embodiment, the error measurement module 201 can collect probe data and/or perform ground truth drives over desired areas of a road network (from a small portion to an entirety of the road network). In this way, location data error information can be determined for points within those desired areas.

In one embodiment, in areas where no ground truth data and/or no probe data exists, the error measurement, the error measurement module 201 can estimate or determine location data uncertainties by analyzing imagery (e.g., aerial imagery or other imagery showing a road segment) and/or processing map data for a given area to determine potential obstructions that can interfere with location data accuracy. For example, with respect to imagery, the error measurement module 201 can perform automated image analysis (e.g., aerial image analysis) using, for instance, pattern recognition to identify portions of a road network that may be subject to obstructions. For example, the error measurement module can identify roads/areas that are covered by trees, bridges, buildings, features, and/or any other objects that can potentially limit line-of-sight exposure from the road to the sky. In such areas, location data error for satellite-based location positioning (e.g., GPS) can be increased to account for larger positioning error due to sky obstruction.

In one embodiment, the amount of error or increase in error can be guided by statistical studies performed using probe data and/or ground truth drives (e.g., as described above) conducted under similar conditions. For example, if trees are detected over a road through analysis of aerial imagery, the error measurement module 201 can retrieve location data error information (e.g., amount of error) calculated for a road segment with similar tree coverage using probe data and/or ground truth drives, and then apply the same amount of error to a corresponding road or area where the same obstructions are detected. In one embodiment, error information for other types of obstructions (e.g., bridges, buildings, mountains, etc.) can be similarly obtained and then applied to areas with the same or similar obstructions.

In another embodiment, instead of image analysis, the error measurement module 201 can consult mapping data to determine potential obstructions to location positioning. For example, existing maps or mapping data may contain information about the locations of roads with potential sky obstructions (e.g., roads passing under bridges, road going through tunnels, roads with adjacent tall buildings, etc.). In one embodiment, the error measurement module 201 can then associate these areas with increased location data uncertainties or error to account for potential interference (e.g., sky obstruction, multi-path effects, etc.). As with the process described above with respect image analysis, in one embodiment, the amount of error to apply in such cases can be guided by location data error information calculated for areas with similar obstructions using probe data and/or ground truth drives.

In one embodiment, the error measurement module 201 can interact with the contextual information module 203 to categorize or otherwise stratify the determined location data error information by one or more contextual parameters. For example, one contextual parameter can be type or quality of the location sensing device (e.g., GPS receiver) used for determining positioning information. Accordingly, in one embodiment, because location and/or associated error measurements can depend on the type of location sensing device the contextual information module 203 can report or signal the error measurement module 201 to report location data error information for each device type and/or quality separately.

In one embodiment, the contextual information module 203 can use other contextual parameters for determining location data error information. For example, a further model can include atmospheric effects (e.g., solar storms, disturbances in the ionosphere, weather conditions, etc.) in the error estimates. Other example of contextual parameters include, but are not limited to, the number of visible positioning satellites from a given location, the position of the satellites as a function of time of the day, etc. It is contemplated that the contextual information module 203 can include any other contextual parameter or potential source of location data error.

In one embodiment, based on the determined location data error information and any relevant contextual parameters, the map generator module 205 can construct or generate a location data error map in which the determined location data error information is encoded as a function of position on the surface of the Earth. In one embodiment, the position on the surface of the Earth is mapped to one or more road networks.

In one embodiment, the map generator module 205 creates a location data error map that consists of a static layer containing location data error information that, for instance, is averaged in time and valid in normal or baseline conditions (e.g., normal atmospheric/weather conditions). In one embodiment, this static or first layer of the location data error map provides location data error as a function of position on Earth only. In one embodiment, in addition to the static or first layer, the location data error map can have an associated mathematical model which uses contextual parameters (e.g., temporal parameters such as time of the day and weather/atmospheric conditions) to refine the static or first layer/model to reflect the current conditions (e.g., specific contexts based on the observed contextual parameters).

In some embodiments, in addition to or instead of the mathematical model for transforming the static layer based on contextual parameters, the map generator module 205 can separately specify the location data errors for observed values for the one or more of the contextual parameters.

In one embodiment, the static or first layer of the location data error map when enhanced with additional contextually-based layers can provide a location data error map tailored to individual sets of contexts. For example, given a baseline layer created as a function of location on Earth and an additional layer created as a function of time of the day and atmospheric condition, the resulting location error map can be dynamically adjusted to provide location data error for any permutation location, time, and atmospheric condition.

In one embodiment, because the location data error map can be stratified according to location sensing device type and/or quality, the location device selection module 207 can process the location data error with respect to each location sensing device and/or service to select an optimal location sensing device or set of devices to employ at a given location to minimize location data error or to obtain location data error that meets a certain location data error threshold.

Figure 3:
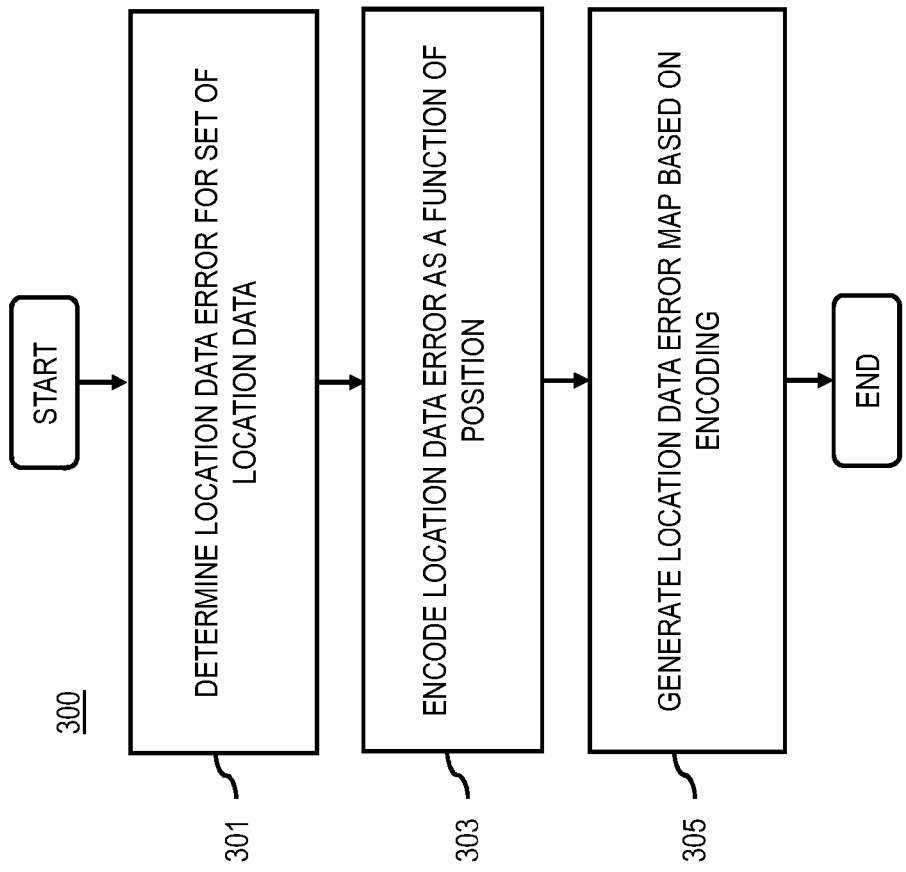
FIG. 3 is a flowchart of a process for providing a location data error map, according to one embodiment.
Figure 10:
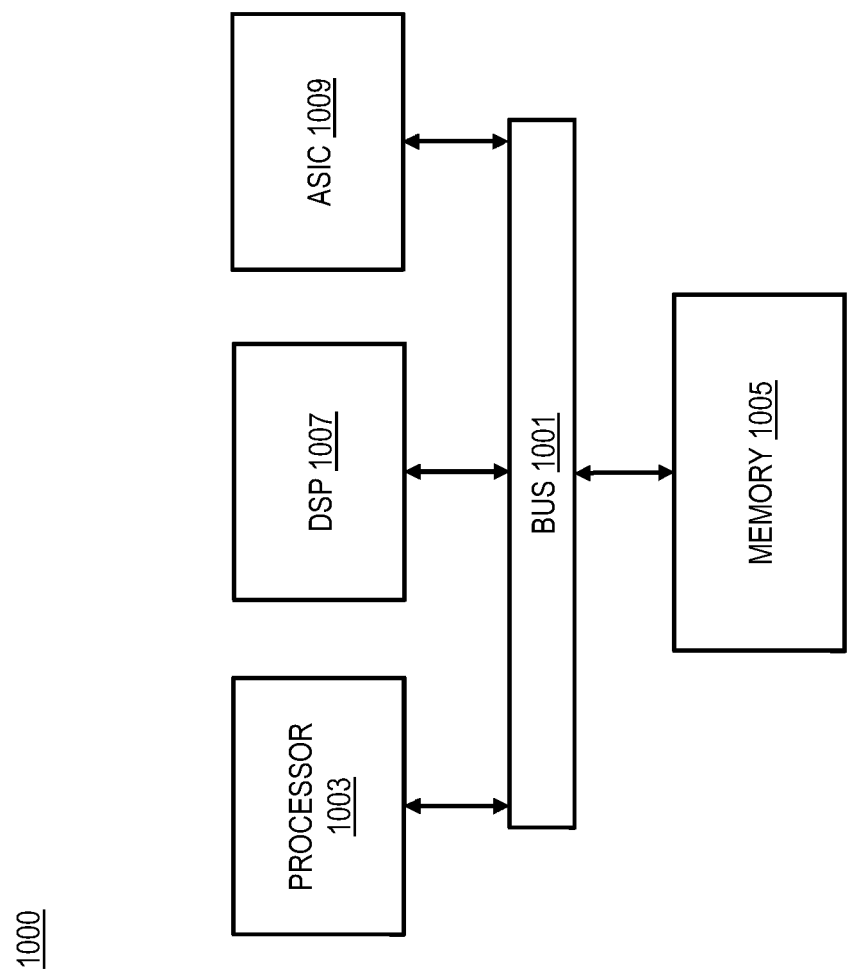
FIG. 10 is a diagram of a chip set that can be used to implement an embodiment of the invention.

FIG. 3 is a flowchart of a process for providing a location data error map, according to one embodiment. In one embodiment, the location error mapping platform 107 performs the process 300 and is implemented in, for instance, a chip set including a processor and a memory as shown in FIG. 10. In addition or alternatively, all or a portion of the process 300 may be performed locally at the UE 103 (e.g., via the location error mapping module 105, the application 119, or another equivalent hardware and/or software component).

In step 301, the location error mapping platform 107 determines location data error information associated with at least one set of location data. In one embodiment, the set of location data includes, for instance, location data that has been collected as well as location data that is intended to be collected in a particular geographic area. As previously discussed, the location error mapping platform 107 can use various means for determining location data error. In one embodiment, the location error determination method are grouped according to whether location data exists.

For example, if location data (e.g., in the form of probe data and/or ground truth data) exists, the location error mapping platform 107 can determine location data error using at least one of the following means: (1) comparing of the location data (e.g., probe data) to a true trajectory inferred based, at least in part, on a path-based map matching of the location data to determine the location data error information; and (2) comparing the location data against a true trajectory determined based, at least in part, one or more ground truth data collection drives performed over one or more routes associated with the location data to determine the location data error information.

In areas where no probe data and/or ground truth data is available or in areas where additional means for determining location data error are to be used, the location error mapping platform 107 can determine location data error using at least one of the following means; (1) processing and/or facilitating a processing of imagery data of one or more locations associated with the location data to identify one or more potential obstructions to location sensing for determining the location data error information; and (2) processing and/or facilitating a processing of mapping data for one or more locations associated with the location data to determine the one or more potential obstructions to location sensing for determining the location data error information. In one embodiment, once the obstructions are identified, location data error information observed in data received from areas with similar obstructions can be used to estimate the location data error for the current area of interest. For example, statistical studies of location data collected from the areas with the same or similar obstructions can be used to apply the observed location data error information to other areas with similar obstructions.

In one embodiment, the location error mapping platform 107 determines the one or more potential obstructions with respect to the location sensing technology or device being used. For example, with respect to location sensing devices that rely on receiving location signals from one or more location positioning satellites, the one or more potential obstructions can include sky obstructions (e.g., overhanging foliage or trees, tall buildings, mountains, canyons, etc.) that may block visibility of the satellites and/or cause other signal effects (e.g., multi-path effects) that can affect the quality of the signals. In the case of sky obstructions, image analysis can apply pattern recognition to identify the potential obstructions in imagery of the area of interest. Similarly, when processing mapping data, areas of the map where potential obstructions (e.g., buildings, bridges, terrain, etc.) are marked can be identified in the mapping data.

In another example, other location sensing technologies may rely on, for instance, a compass sensor. These compass sensors, in turn, may be susceptible to magnetic interference. Accordingly, potential obstructions in this case can include objects (e.g., metallic structures, power generators, etc.) that can cause magnetic interference. It is noted that the examples of obstructions with respect to satellite-based positioning and compass-based positioning are provided by way of illustration and not limitation. It is contemplated that the location error mapping platform 107 can be configured to identify any type of obstruction (e.g., via image analysis or mapping data analysis) for any type of location sensing device or technology.

In step 303, the location error mapping platform 107 causes, at least in part, an encoding of the location data error information as a function of a position parameter. In one embodiment, the encoding of the location data error information as the function of the position parameter is with respect to one or more road networks of at least one geographic area associated with the location data. For example, the location data error information can be associated with a particular location using geographic coordinates or other location identifier. In one embodiment, as part of the encoding, the location error mapping platform 107 can partition a geographic into subunits or segments and then a location data error associated with the subunit or segment. In one embodiment, the subunit or segment can be a defined area (e.g., a bounded box) in the case of a free-form area. In addition or alternatively, if the location data error map is created with respect to a travel or road network, the subunit or segment can refer to a segment of a road (e.g., a segment corresponding to each 10 meter segment of a roadway).

In one embodiment, the encoding can be in the form of a record (e.g., in the geographic database 121) or look-up entry that associates a particular location data error value or information with a corresponding location, segment, subunit, etc. In another embodiment, the encoding can be a mathematical representation (e.g., a mathematical function) that can model the location data error over particular location, area, segment, subunit, etc. For example, an input of the location data error function can be an area ID and the output can be an estimated location data error for the area.

In step 305, the location error mapping platform 107 causes, at least in part, a generation of at least one location data error map based, at least in part, on the encoding. As previously discussed, in one embodiment, the location error mapping platform 107 can create a location error map with multiple layers as described below with respect to FIG. 4.

Figure 4:
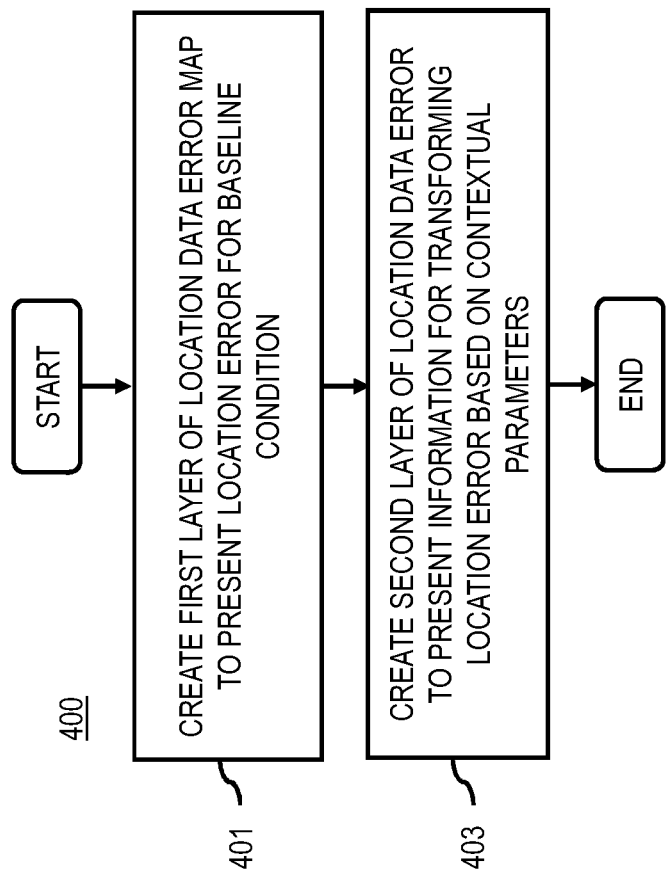
FIG. 4 is a flowchart of a process for providing multiple layers of a location data error map, according to one embodiment.

FIG. 4 is a flowchart of a process for providing multiple layers of a location data error map, according to one embodiment. In one embodiment, the location error mapping platform 107 performs the process 400 and is implemented in, for instance, a chip set including a processor and a memory as shown in FIG. 10. In addition or alternatively, all or a portion of the process 400 may be performed locally at the UE 103 (e.g., via the location error mapping module 105, the application 119, or another equivalent hardware and/or software component).

In step 401, the location error mapping platform 107 causes, at least in part, a creation of at least one first layer of the at least one location data error map. In one embodiment, the least one layer presents location data error information that is averaged in time and associated with a baseline environmental condition. In one embodiment, the baseline environmental condition includes, for instance, average atmospheric conditions and/or clear weather. It is contemplated that the location error mapping platform 107 can set any baseline condition for generating the baseline location data error map.

In step 403, the location error mapping platform 107 initiates the encoding of the location data error as a further function of one or more other contextual parameters and causes, at least in part, a creation of at least one second layer of the at least one location data error map. In one embodiment, the one or more contextual parameters include, at least in part, a temporal parameter, an environmental parameter, a location satellite visibility parameter, or a combination thereof. In other words, the location error mapping platform 107 can select contextual parameters that can potentially affect location data precision. For example, the temporal factor can potentially affect location data error for satellite based location sensing devices because different satellites may be available depending on the time of day. With respect to an environmental parameter, weather conditions can affect location accuracy by potentially interfering with signal reception from location satellites (e.g., heavy rain can potentially block location signals). With respect to location satellite visibility parameter, the number of location satellites visible to a location sensing device at any given time can significantly affect location data accuracy. It is noted that these contextual parameters are provided as examples and not as limitations to the various embodiments described herein.

Accordingly, the location error mapping platform 107 can determine the effects of the contextual parameters on location data error or precision. For example, the location error mapping platform 107 can perform studies to determine location error under different contextual conditions. In one embodiment, each contextual parameter can be assessed individually and/or cumulatively.

In one embodiment, the at least one second layer of the location error map presents information for transforming the location data error information based, at least in part, on the further function of the one or more contextual parameters. For example, the location error mapping platform 107 can define mathematical functions (e.g., based on statistical studies) that describe the effects of the contextual parameters on the baseline location data error information provided in the first or static layer. In one embodiment, the mathematical functions can be defined for each parameter individually or provide for cumulative for multiple contextual parameters. In another embodiment, each contextual parameter can be modeled in separate layers of the location error map, and a user can activate or select different layers depending on desired contextual values.

Figure 5:
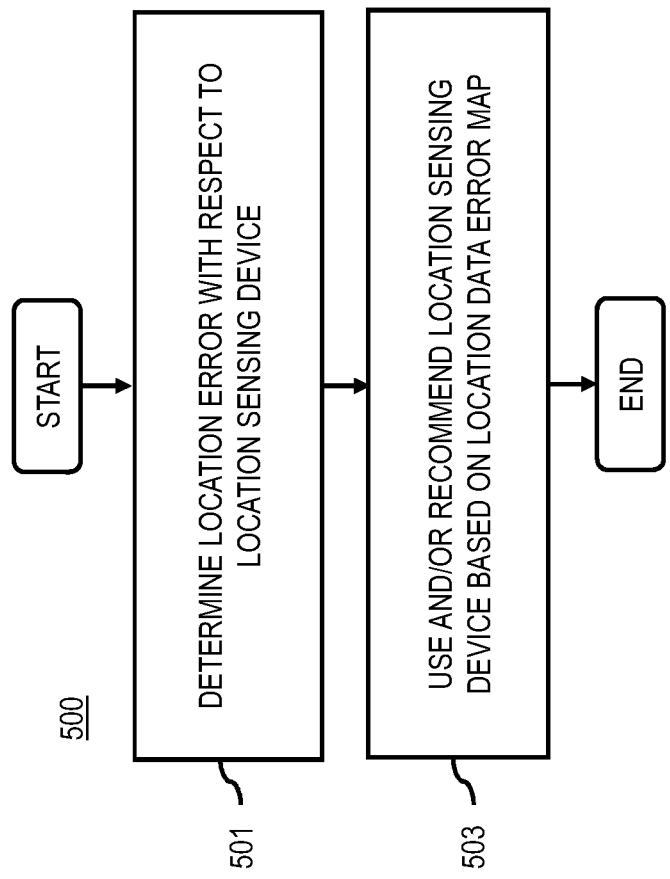
FIG. 5 is a flowchart of a process for providing a location data error map based on location sensing device, according to one embodiment.

FIG. 5 is a flowchart of a process for providing a location data error map based on location sensing device, according to one embodiment. In one embodiment, the location error mapping platform 107 performs the process 400 and is implemented in, for instance, a chip set including a processor and a memory as shown in FIG. 10. In addition or alternatively, all or a portion of the process 400 may be performed locally at the UE 103 (e.g., via the location error mapping module 105, the application 119, or another equivalent hardware and/or software component).

In step 501, the location error mapping platform 107 determines the location data error information with respect to at least one type, at least one quality, or a combination thereof of one or more location sensing devices that collected the location data. As previously noted, location data error can also depend on the device that was used to collect the location data. Accordingly, the location error mapping platform 107 can stratify the location data error information based on device type. For example, location data error information can be provided separately for satellite-based location sensing devices, dead-reckoning location sensing devices, triangulation-based location sensing devices, etc.

In one embodiment, instead of or in addition to device type, the location error mapping platform 107 can stratify location error information based on a quality of the device. The quality, for instance, may specify a precision level of the location sensing device (e.g., centimeter-level accuracy vs. meter-level accuracy). As a result, devices of different types may be grouped together because they provide a similar quality or level of performance.

In step 503, the location error mapping platform 107 determines at least one location sensing device to use, to recommend, or a combination thereof based, at least in part, on the at least one location data error map. As previously discussed, a fusion or combination of different location sensing technologies can be used to improved location data accuracy. However, activating all available location sensing devices simultaneously can be potentially resource intensive (e.g., with respect to computational resources, energy resources, bandwidth resources, etc.). Accordingly, in one embodiment, the location error mapping platform 107 can use the location error map to determine estimated location data error information for each type of available location sensing device, and then use or recommend one or more of the devices to achieve an optimal location data accuracy.

In one embodiment, the optimal location data accuracy can be determined based on a location data error threshold value. For example, the location error mapping platform 107 can specify a minimum level of precision needed by a user, and then based on the location error map, select location sensing technologies that can meet that minimum threshold. Alternatively, the location error mapping platform 107 can use the location error map to determine which location sensing device or combination of location devices can achieve the best location data precision in a given area, and then use or recommend that device or combination of devices. In one embodiment, this selection or recommendation of location device or combination of devices can be performed continuously as a user travels to provide dynamic real-time selection of devices.

Figure 6:
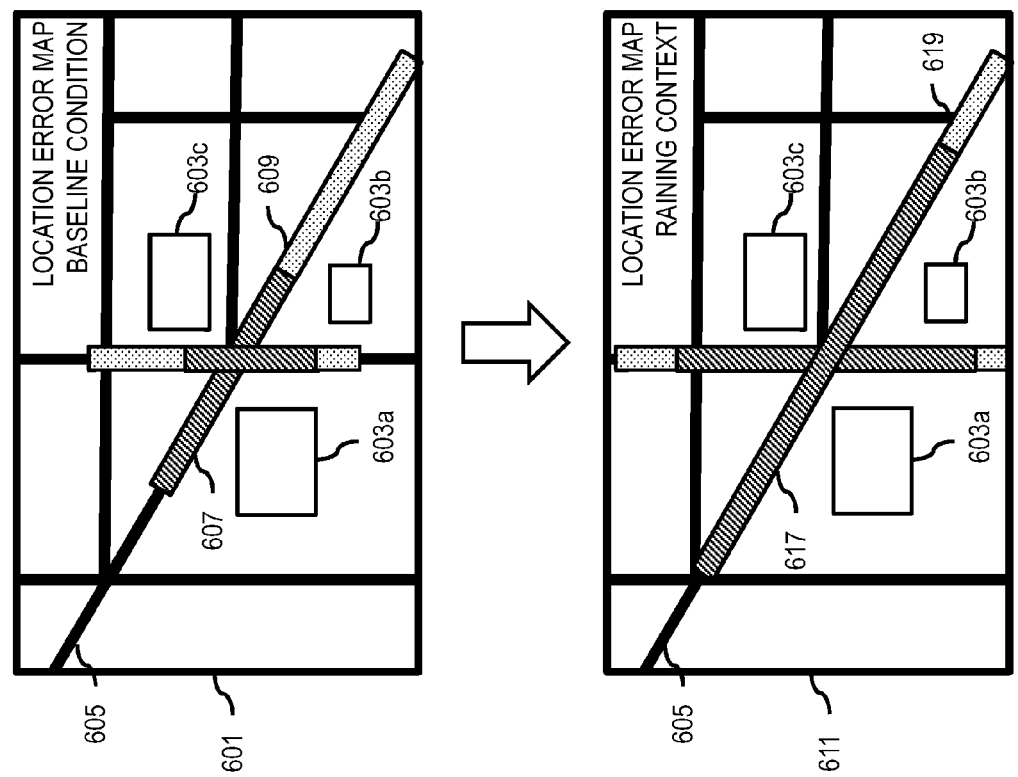
FIG. 6 is a diagram of a location error map, according to one embodiment.

FIG. 6 is a diagram of a location error map, according to one embodiment. As shown in FIG. 6, a location data error map 601 presents location data error information for an urban center area including three buildings 603a-603c (also collectively referred to as buildings 603) and a surrounding road network 605. In this example, the location data error map 601 represents the location data error information for a baseline condition (e.g., provided as a function of position on the Earth with no other contextual parameters). The location error information, for instance, is presented as overlays on the road network 605. Areas of high location error are presented in a darker shading as indicated in, for instance, dark shaded area 607. Areas of medium location error are presented in a lighter shading as indicated in, for instance, light shaded area 609.

In this example, the buildings 603 create an "urban canyon" effect that results in areas of poor location data precision within vicinity of the city center for satellite-based location sensing devices. As previously discussed, the location data error information can be determined using probe data and/or ground truth drives through the area. In addition or alternatively, the location error information can be determined based on analysis of aerial imagery of the city where the buildings 603 can be recognized (e.g., through pattern recognition) to occur along side streets passing through the center. The location error mapping platform 107 can then estimate the location error information based on the calculated presence and/or proximity of the buildings 603 to the road network 605. Similarly, the location error mapping platform 107 can identify the buildings by searching through mapping data of the area that may include dimensions and/or footprints of the buildings 603, which can then support a similar location data error estimation.

In one embodiment, a current weather context can be determined to further refine the location data error map 601 for the given context. In this example, the current weather conditions indicate that it is raining heavily in the area depicted in the location data error map 601. Accordingly, a second layer of the location data error map 601 is used to transform the location error information into a context-based location data error map 611 to reflect the rainy conditions. As shown, the transformation expands areas where location data error can be problematic. For example, dark shaded area 617 (e.g., indicating areas of high location data error) of location data error map 611 is expanded to a larger portion of the road network 605 when compared to the dark shaded area 607 of location data error map 601. Similarly, light shaded area 619 (e.g., indicating areas of low location data error) of location data error map 611 is expanded over more potions of the road network 605 when compared to the light shaded area 609 of location data error map 601.

Figure 7:
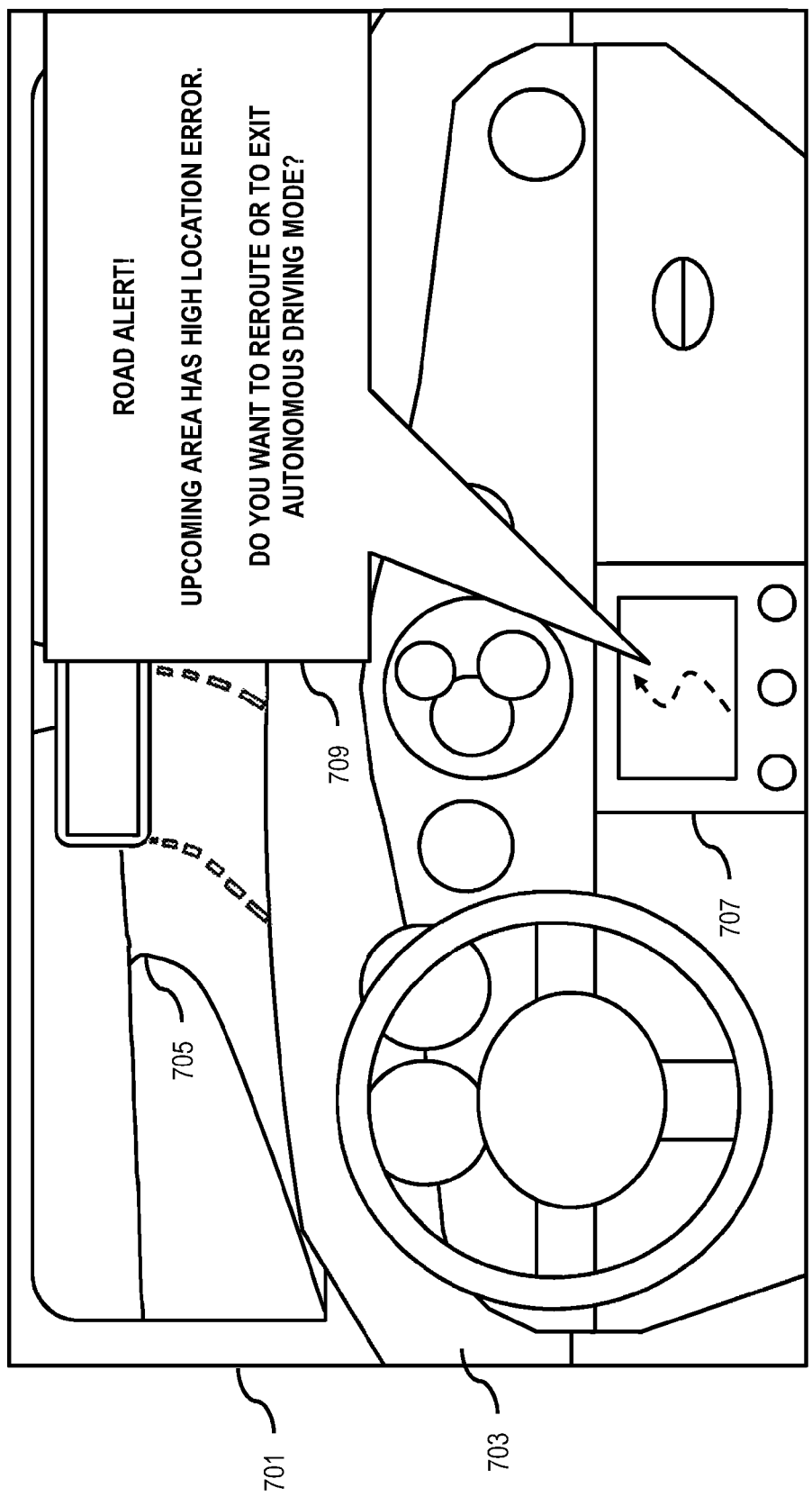
FIGS. 7 and 8 are diagrams of user interfaces used in the processes for providing a location error map, according to various embodiments.
Figure 8:
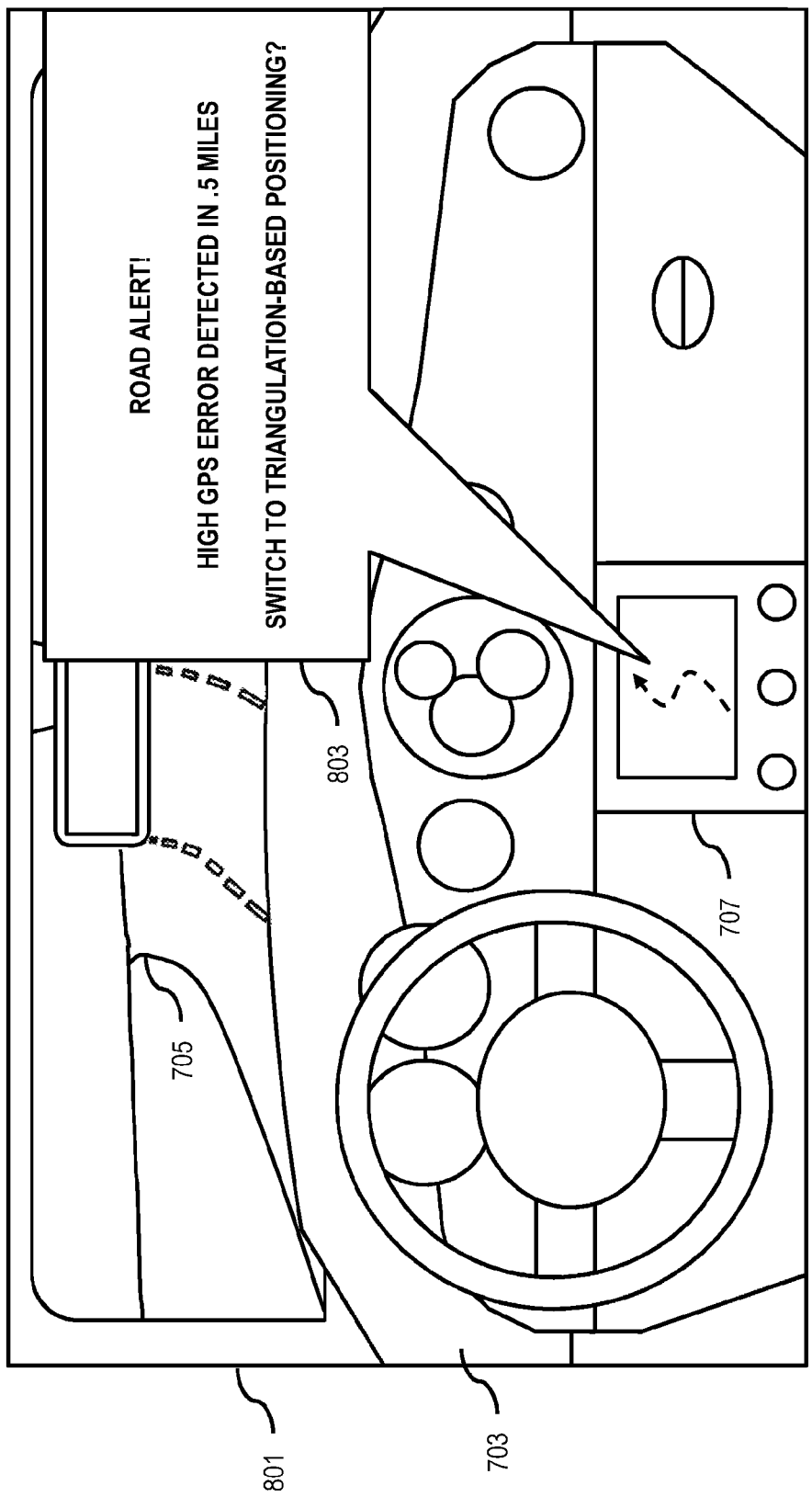

FIGS. 7 and 8 are diagrams of user interfaces used in the processes for providing a location error map, according to various embodiments. FIG. 7 illustrates an example user interface 701 for interacting with an autonomous vehicle 703 traveling on a road network 705. In this example, the autonomous vehicle 703 detects that it is approaching a portion of the road network 705 that is associated with high location data error as indicated in a location data error map. Based on this determination, the an embedded navigation system 707 of the vehicle 703 initiates a presentation of the notification 709 to alert a passenger that an upcoming area has high location data error that, for instance, can potentially interfere with autonomous operation of the vehicle 703 because the upcoming estimated location data error is beyond the tolerance for autonomous operation. The autonomous vehicle 703 then presents the passenger with options either to reroute to areas where location data error can support autonomous operation or to exit autonomous operation and enter manual operation by the passenger.

FIG. 8 illustrates a similar example user interface 801 for interacting with the autonomous vehicle 703 traveling the on the road network 705. As in the example of FIG. 7, the autonomous vehicle 703 detects that an upcoming area has high location error. However, in the example of FIG. 8, the autonomous vehicle 703 also determines that the high location error is associated with the currently active location sensing device (e.g., a GPS device). The autonomous vehicle then searches location data error maps for other available location sensing devices, and determines that a triangulation-based sensing device of the autonomous vehicle 703 can provide an acceptable level of location data precision. Accordingly, the embedded navigation system 707 presents a notification 803 to alert the user of the upcoming area of high location data error and provide an option to switch to the triangulation-based positioning to maintain a desired level of location data precision.

The processes described herein for providing a location data error map may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
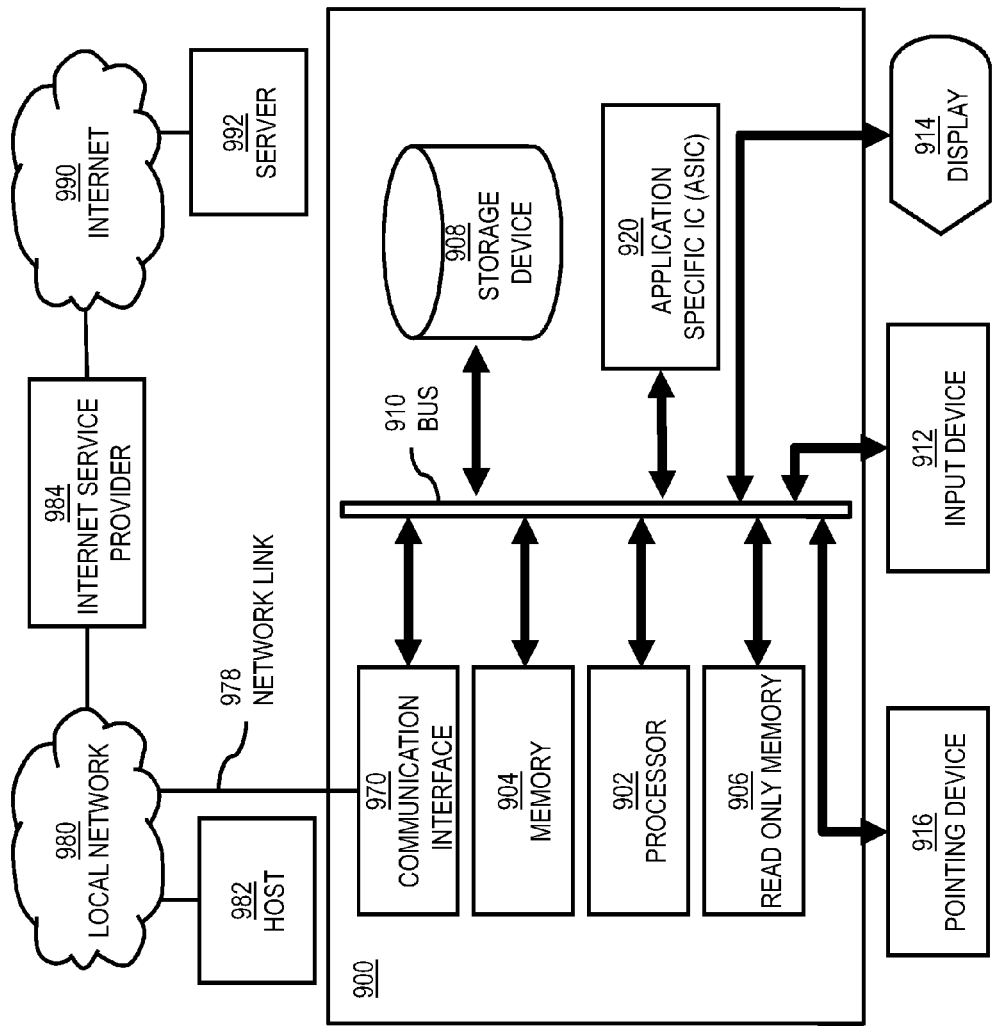
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide a location data error map as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing a location data error map.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing a location data error map. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for providing a location data error map. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing a location data error map, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 109 for providing a location data error map to the UE 103.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to provide a location data error map as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing a location data error map.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide a location data error map. The memory 1005 also stores the data associated with or generated by the execution of the inventive steps.

Figure 11:
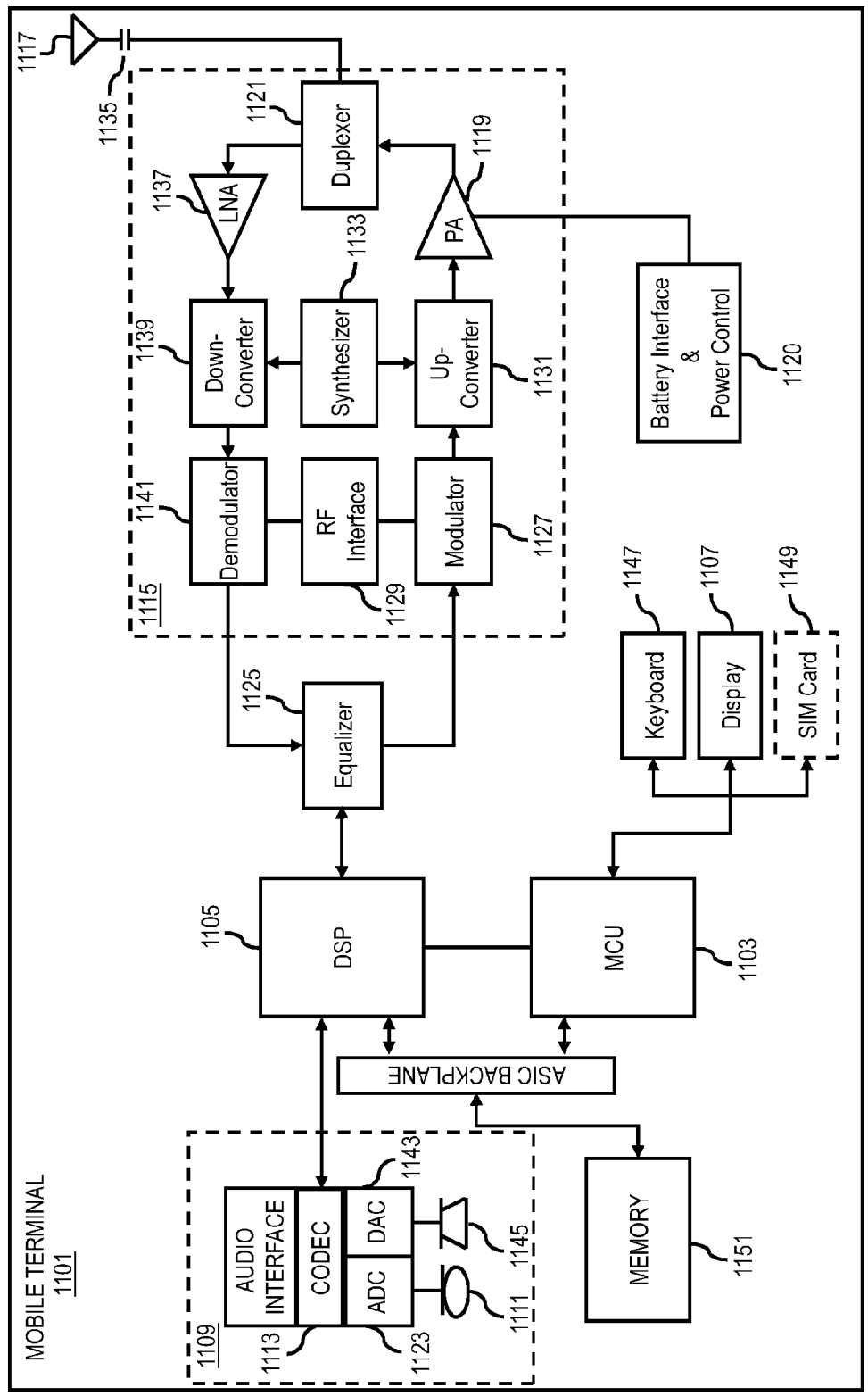
FIG. 11 is a diagram of a mobile terminal (e.g., mobile computer) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal

1101, or a portion thereof, constitutes a means for performing one or more steps of providing a location data error map. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing a location data error map. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WIMAX), Long Term Evolution (LTE) networks, code division multiple access (CDMA), wideband code division multiple access (WCDMA), WIFI, satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide a location data error map. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by an apparatus, location sensing data error information caused by one or more potential obstructions to location sensing associated with at least one set of location data;
   encoding, at least in part by the apparatus, the location sensing data error information as a function of a position parameter into location sensing data error overlays over one or more road networks; and
   generating, at least in part by the apparatus, a presentation of at least one location sensing data error map by mapping each of the location sensing data error overlays with a respective visual characteristic varied relative to a location sensing data error size over the one or more road networks.

2. A method of claim 1, further comprising:
   creating, at least in part by the apparatus, at least one first layer of the at least one location sensing data error map,
   wherein the least one layer presents the location sensing data error information that is averaged in time and associated with a baseline environmental condition.

3. A method of claim 1, further comprising:
   initiating the encoding of the location sensing data error information as a further function of one or more other contextual parameters.

4. A method of claim 3, further comprising:
   creating, at least in part by the apparatus, at least one second layer of the at least one location sensing data error map,
   wherein the at least one second layer presents information for transforming the location sensing data error information based, at least in part, on the further function of the one or more contextual parameters.

5. A method of claim 3, wherein the one or more contextual parameters include, at least in part, a temporal parameter, an environmental parameter, a location satellite visibility parameter, or a combination thereof.

6. A method of claim 1, further comprising:
   determining the location sensing data error information with respect to at least one type, at least one quality, or a combination thereof of one or more location sensing devices that collected the location data,
   wherein the one or more potential obstructions are determined by processing mapping data, imagery data, or a combination thereof, of one or more locations.

7. A method of claim 6, wherein the location sensing data error information is further determined by comparing the location data to a true trajectory, wherein the true trajectory is inferred based, at least in part, on a path-based map matching of the location data or determined based, at least in part, on one or more ground truth data collection drives performed over one or more routes associated with the location data.

8. A method of claim 1, further comprising:
   determining the one or more potential obstructions with respect to one or more location positioning satellites.

9. A method of claim 1, wherein the encoding of the location sensing data error information as the function of the position parameter is with respect to the one or more road networks of at least one geographic area associated with the location data.

10. A method of claim 1, further comprising:
    determining at least one location sensing device to use, to recommend, or a combination thereof based, at least in part, on the at least one location sensing data error map.

11. A method of claim 1, further comprising:
    prompting on a user interface with an option to reroute to an area which location sensing data errors support an autonomous driving operation and with an option to exit the autonomous driving operation.

12. A method of claim 1, further comprising:
    prompting on a user interface with an alert of an upcoming area with one or more location sensing data errors above a predetermined threshold, and with an option to switch to an alternative positioning mechanism meeting a predetermined level of location data precision.

13. An apparatus comprising:
    at least one processor; and
    at least one memory including computer program code for one or more programs,
    the at least one memory and the computer program code configured to, with the at least one processor, cause the apparatus to perform at least the following;
        determine location sensing data error information caused by one or more potential obstructions to location sensing associated with at least one set of location data;
        encode, at least in part, the location sensing data error information as a function of a position parameter into location sensing data error overlays over one or more road networks; and
        generate, at least in part, a presentation of at least one location sensing data error map by mapping each of the location sensing data error overlays with a respective visual characteristic varied relative to a location sensing data error size over the one or more road networks.

14. An apparatus of claim 13, wherein the apparatus is further caused to:
    create, at least in part, at least one first layer of the at least one location sensing data error map,
    wherein the least one layer presents the location sensing data error information that is averaged in time and associated with a baseline environmental condition.

15. An apparatus of claim 13, wherein the apparatus is further caused to:
    initiate the encoding of the location sensing data error information as a further function of one or more other contextual parameters.

16. An apparatus of claim 15, wherein the apparatus is further caused to:
create, at least in part, at least one second layer of the at least one location sensing data error map,
wherein the at least one second layer presents information for transforming the location sensing data error information based, at least in part, on the further function of the one or more contextual parameters.

17. An apparatus of claim 15, wherein the one or more contextual parameters include, at least in part, a temporal parameter, an environmental parameter, a location satellite visibility parameter, or a combination thereof.

18. An apparatus of claim 13, wherein the apparatus is further caused to:
determine the location sensing data error information with respect to at least one type, at least one quality, or a combination thereof of one or more location sensing devices that collected the location data,
wherein the one or more potential obstructions are determined by processing mapping data, imagery data, or a combination thereof, of one or more locations.

19. An apparatus of claim 18, wherein the location sensing data error information is further determined by comparing the location data to a true trajectory, wherein the true trajectory is inferred based, at least in part, on a path-based map matching of the location data or determined based, at least in part, one or more ground truth data collection drives performed over one or more routes associated with the location data.

20. A non-transitory computer-readable storage medium carrying one or more sequences of one or more instructions which, when executed by one or more processors, cause an apparatus to perform:
determining location sensing data error information caused by one or more potential obstructions to location sensing associated with at least one set of location data;
encoding, at least in part, the location sensing data error information as a function of a position parameter into location sensing data error overlays over one or more road networks; and
generating, at least in part, a presentation of at least one location sensing data error map by mapping each of the location sensing data error overlays with a respective visual characteristic varied relative to a location sensing data error size over the one or more road networks.

* * * * *